United States Patent
Mayer et al.

(10) Patent No.: US 12,475,265 B2
(45) Date of Patent: Nov. 18, 2025

(54) SECURE STORAGE ARCHITECTURES FOR COMPUTING DEVICES

(71) Applicant: Infineon Technologies AG, Neubiberg (DE)

(72) Inventors: Albrecht Mayer, Deisenhofen (DE); Joerg Syassen, Oberhausen (DE); Glenn Ashley Farrall, Long Ashton (GB); Manfred Zimmerman, Sauerlach (DE)

(73) Assignee: Infineon Technologies AG, Neubiberg (DE)

( * ) Notice: Subject to any disclaimer, the term of this patent is extended or adjusted under 35 U.S.C. 154(b) by 210 days.

(21) Appl. No.: 17/805,984

(22) Filed: Jun. 8, 2022

(65) Prior Publication Data

US 2023/0401341 A1 Dec. 14, 2023

(51) Int. Cl.
   G06F 21/78 (2013.01)
   H04L 9/32 (2006.01)

(52) U.S. Cl.
   CPC .............. *G06F 21/78* (2013.01); *H04L 9/3247* (2013.01)

(58) Field of Classification Search
   CPC ................................ G06F 21/78; H04L 9/3247
   USPC ........................................................ 713/193
   See application file for complete search history.

(56) References Cited

U.S. PATENT DOCUMENTS

| | | | |
|---|---|---|---|
| 9,697,388 B1* | 7/2017 | Jacobson | G06K 7/0086 |
| 9,971,909 B2* | 5/2018 | Mittal | G06F 21/602 |
| 2007/0088957 A1* | 4/2007 | Carson | H04L 63/12 |
| | | | 713/176 |
| 2009/0112823 A1* | 4/2009 | Aharonov | G06F 21/78 |
| 2017/0315944 A1* | 11/2017 | Mayer | G06F 13/24 |
| 2017/0337380 A1* | 11/2017 | Domke | H04L 9/3242 |
| 2021/0028924 A1* | 1/2021 | Ivkushkin | H04L 9/3247 |
| 2021/0117555 A1* | 4/2021 | Bernat | H04L 9/30 |
| 2024/0146540 A1* | 5/2024 | Castle | G06F 21/64 |

* cited by examiner

*Primary Examiner* — Dant B Shaifer Harriman
(74) *Attorney, Agent, or Firm* — Shumaker & Sieffert, P.A.

(57) ABSTRACT

A non-volatile memory (NVM) system external to a processor comprising an NVM and a memory controller may perform various aspects of the techniques. The NVM may store a first cryptographic signature and first data. The memory controller may, responsive to a first write request to write updated data to at least a portion of the NVM, to store the updated data in the NVM along with the first data to create second data. The memory controller may also generate, a second cryptographic signature that always differs from the first cryptographic signature, and store the second cryptographic signature as a current cryptographic signature. The memory controller may further output, to the processor, the current cryptographic signature as a reference signature, where the memory controller always replaces the current cryptographic signature, with cryptographic properties, whenever the NVM is written to and does not otherwise permit writing the current cryptographic signature.

19 Claims, 5 Drawing Sheets

SECURE STORAGE ARCHITECTURES FOR COMPUTING DEVICES

TECHNICAL FIELD

This disclosure relates to secure storage architectures for computing devices.

BACKGROUND

Processors, such as microcontrollers, are increasingly being deployed in industrial settings (e.g., for motor control and signal processing), vehicles (e.g., control of combustion engines, electrical and hybrid vehicles, transmission control units, chassis domains, braking systems, electrical power steering systems, driver assistance systems, etc.), and the like. To improve execution and/or operating efficiency (e.g., in terms of execution speed, memory access, and accompanying power consumption), microcontrollers may be fabricated using smaller process node sizes. While smaller processor node sizes may improve execution and/or operating efficiency, integrating on-chip storage at similar process node sizes into microcontrollers may be cost prohibitive for certain applications, such as the above noted industrial settings and vehicles.

To avoid integrating on-chip storage having similar, if not the same, process node sizes, microcontrollers may interface with external storage devices having larger process node sizes to retrieve code or access other data required for controlling certain systems and/or performing signal processing. However, such external storage devices may pose a security concern as the code or data stored to the external storage devices may be read and/or manipulated, resulting in potential safety concerns (e.g., especially when considering operational control of vehicle systems, such as driver assistance systems, and/or safety systems for controlling motors or other devices, such as industrial robots used in manufacturing).

SUMMARY

In general, techniques are described for a secure external storage architecture for computing devices. Various aspects of the techniques may enable a non-volatile memory system external to a processor, such as a microcontroller, to securely store data in a manner that prevents tampering or other manipulation of the data stored to non-volatile memory of the non-volatile memory system. The non-volatile memory system may include a memory controller that may determine a cryptographic signature for data stored to the non-volatile memory system and only allows replacement of the current cryptographic signature, with cryptographic properties, in that the replacement cryptographic signature always differs from the current cryptographic signature, whenever the non-volatile memory is written to and does not otherwise permit writing the current cryptographic signature. 3

The memory controller may return the replacement cryptographic signature to the processor, which may separately store the replacement cryptographic signature as a reference cryptographic signature. Responsive to a read request from the processor to read data stored to the non-volatile memory, the memory controller may output, to the processor, the replacement cryptographic signature along with the data. The processor may then compare the separately stored reference cryptographic signature to the replacement cryptographic signature in order to verify that the data is valid and has not been manipulated. The processor may then, after verifying that the data is valid and has not been manipulated, process the data (e.g., when the data represents code, execute the code).

In this way, various aspects of the techniques may enable processors having small process node sizes (e.g., less than 20 nanometers) to securely interface with external non-volatile memory systems having larger process node sizes (e.g., greater than 20 nanometers). As the processor may have small process nodes sizes, the processor may be faster (e.g., due to the smaller process nodes sizes, which may result in less distance within the node itself as well as between nodes) while also being more efficient to operate (e.g., in terms of power consumption). Further, because larger process node sizes may be used for the non-volatile memory system, the non-volatile memory system may be less expensive while still enabling secure storage of data that reduces, if not eliminates, security risks as a result of the cryptographic protections. In this respect, various aspects of the techniques may improve operation of computing devices themselves.

In one example, aspects of the techniques are directed to a non-volatile memory system external to a processor, the non-volatile memory system comprising: a non-volatile memory adapted to store a first cryptographic signature as a current cryptographic signature and first data; and a memory controller configured, responsive to any write request, including a first write request to write updated data to at least a portion of the non-volatile memory, to: store the updated data in the non-volatile memory along with at least a portion of the first data to create second data; generate, a second cryptographic signature that always differs from the first cryptographic signature; store the second cryptographic signature as the current cryptographic signature; and output, responsive to the first write request and to the processor, the current cryptographic signature as a reference signature, wherein the memory controller always replaces the current cryptographic signature, with cryptographic properties, whenever the non-volatile memory is written to and does not otherwise permit writing the current cryptographic signature.

In another example, aspects of the techniques are directed to a method comprising: storing, by a non-volatile memory system external to a processor, a first cryptographic signature as a current cryptographic signature and first data; responsive to any write request, including a first write request, to write updated data to at least a portion of the non-volatile memory: storing, by a memory controller, the updated data in the non-volatile memory along with at least a portion of the first data to create second data; generating, based on the second data, and by the memory controller, a second cryptographic signature that always differs from the first cryptographic signature; storing, by the memory controller, the second cryptographic signature as the current cryptographic signature; and outputting, responsive to the first write request, to the processor, and by the memory controller, the current cryptographic signature as a reference signature, wherein the memory controller always replaces the current cryptographic signature, with cryptographic properties, whenever the non-volatile memory is written to and does not otherwise permit writing the current cryptographic signature.

In another example, aspects of the techniques are directed to a system comprising: a processor; and a non-volatile memory system external to the processor, the non-volatile memory system comprising: a non-volatile memory adapted to store a first cryptographic signature as a current cryptographic signature and first data; and a memory controller configured, responsive to any write request, including a first write request, to write updated data to at least a portion of the non-volatile memory, to: store the updated data in the non-volatile memory along with at least a portion of the first data to create second data; generate, based on the second data, a second cryptographic signature that always differs from the first cryptographic signature; store the second cryptographic signature as the current cryptographic signature; and output, responsive to the first write request and to the processor, the current cryptographic signature as a reference signature, wherein the memory controller always replaces the current cryptographic signature, with cryptographic properties, whenever the non-volatile memory is written to and does not otherwise permit writing the current cryptographic signature.

The details of one or more aspects of the techniques are set forth in the accompanying drawings and the description below. Other features, objects, and advantages of these techniques will be apparent from the description and drawings, and from the claims.

DETAILED DESCRIPTION

Figure 1A:
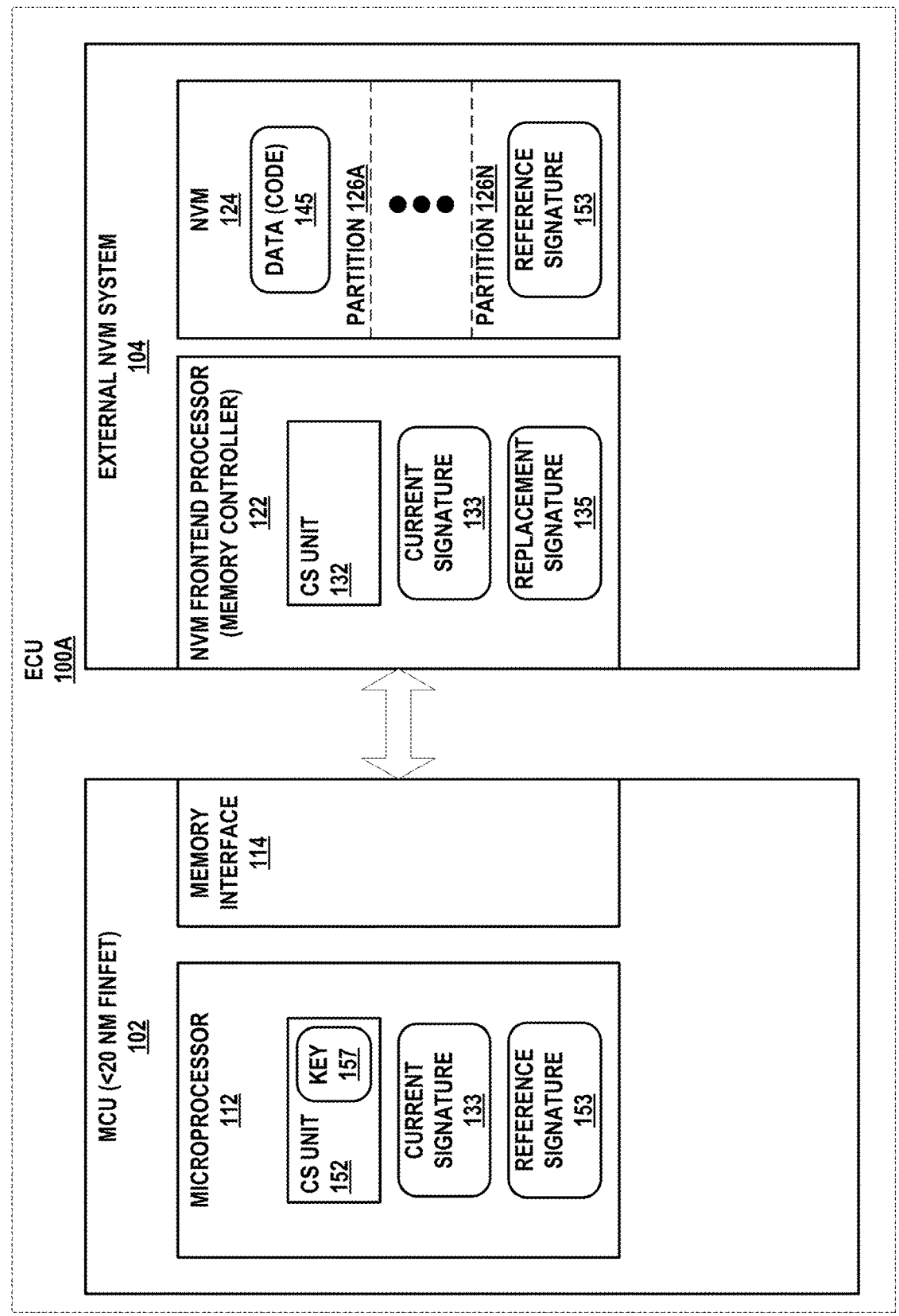
FIGS. 1A and 1B are diagrams illustrating an example electronic control unit (ECU) configured to perform various aspects of the secure external storage techniques described in this disclosure.
Figure 1B:
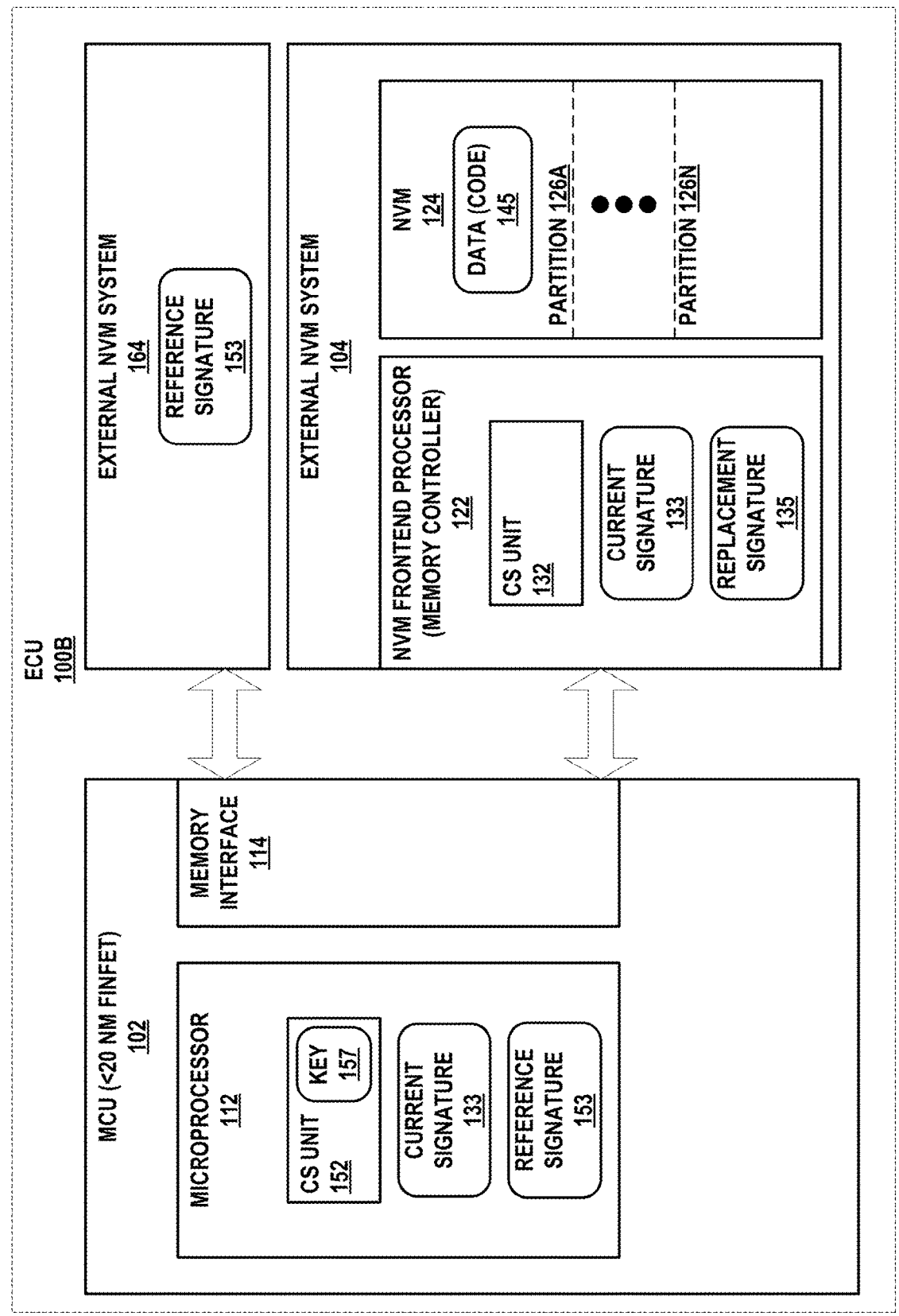

FIGS. 1A and 1B are diagrams illustrating example electronic control units (ECUs) configured to perform various aspects of the secure external storage techniques described in this disclosure. As shown in the example of FIG. 1A, ECU 100A includes a microcontroller unit (MCU) 102 and an external non-volatile memory (NVM) system 104.

MCU 102 may represent one example of a processor, which may refer to a wide variety of different types of computing hardware control logic (which may also be referred to as computing hardware control circuits). MCU 102 may represent a particular type of computing hardware control logic in which a central processing unit (CPU) and/or other type of processor (such as a graphics processing unit—GPU) is fabricated to include on-chip memory (e.g., volatile memory possibly in the form of one or more layers of caches, random access memory, and/or other types of volatile memory), timers, bus controls, input/output (I/O) interfaces (which may also be referred to as "serial interfaces"), and possibly other hardware interfaces for global positioning system (GPS), cellular communication, etc. MCU 102 may also be referred to a single integrated chip that incorporates the foregoing CPU, memory, timers, bus controls, and/or interfaces (often in a single dedicated package).

While described with respect to MCU 102, various aspects of the techniques may be implemented with respect to any type of processor. Examples of other types of processors may include a microprocessor (e.g., a CPU), an application-specific integrated chip (ASIC), a field programmable gate array (FPGA), a digital signal processor (DSP), an image processor, a display processor, a GPU, a network processor, and any other type of processor adapted to interface with an external NVM system, such as external NVM system 104.

In the example of FIG. 1A, MCU 102 includes a microprocessor 112 and a memory interface 114. Microprocessor 112 may denote the physical chip space in which the CPU or any of the other types of processors listed above is implemented. Memory interface 114 may represent an example of a hardware interface implemented on chip along with microprocessor 112. Memory interface 114 may, as an example, include a double data rate (DDR) memory interface or other type of synchronous or asynchronous memory interface (including single data rate—SDR—memory interfaces). Memory interface 114 may be configured to interact with external NVM system 104.

External NVM system 104 may represent any type of storage system in which non-volatile memory is adapted to store data that is externally accessible by a processor, such as MCU 102. External NVM system 104 includes, as shown in the example of FIG. 1A, a NVM frontend processor 122 (which may also be referred to as memory controller 122) and NVM 124.

Memory controller 122 may represent a processor or other hardware control logic that facilitates access to NVM 124. Memory controller 122 may present an interface similar to memory interface 114 that implements control logic by which to receive read requests from MCU 102 to read data stored to NVM 124, write requests from MCU 102 to write data stored to NVM 124, or any other I/O operation to be performed with respect to NVM 124 as well as other maintenance operation (e.g., defragmentation, refresh, etc.), security operation (e.g., encryption), or other data operation to be performed with respect to NVM 124.

NVM 124 may represent any type of non-volatile memory. Example types of non-volatile memory include flash memory (such as NAND flash memory and/or solid state drives—SSD), erasable programmable read-only memory (EPROM), ferroelectric random access memory (RAM), computer data storage devices (e.g., disk storage, hard disk storage, optical discs, etc.) or any other type of data storage that is configured to retain data through power cycles. NVM 124 may include one or more different types of non-volatile memory arranged according to various storage architectures, which may prioritize storage to various different levels of memory having certain characteristics (in terms of access speeds, read and write data bandwidths, etc.) to accommodate different operational contexts. NVM 124 may form part of a computer-readable storage medium, which may also be referred to as a non-transitory computer-readable medium or non-transitory computer-readable storage medium.

While described as consisting of non-volatile memory, NVM 124 may also include volatile memory. Examples of volatile memory may include caches, buffers, random access memory (RAM, including dynamic RAM—DRAM, or static RAM—SRAM), or any other type of memory that does not retain data through power cycles. The above noted computer-readable storage medium may include non-volatile memory or a combination of non-volatile memory and volatile memory (where volatile memory may be arranged at higher levels of the storage architecture hierarchy to accommodate fast read and write speeds of data, which may be pushed down the storage architecture hierarchy to non-volatile memory for purposes of long-term storage across power cycles).

Processors, such as MCU 102, may increasingly be deployed in industrial settings (e.g., for motor control and/or signal processing), vehicles (e.g., control of combustion engines, electrical and hybrid vehicles, transmission control units, chassis domains, braking systems, electrical power steering systems, driver assistance systems, etc.), and the like. To improve execution and/or operating efficiency (e.g., in terms of execution speed, memory access, and accompanying power consumption), MCU 102 may be fabricated using smaller process node sizes. While smaller processor node sizes (e.g., less than 20 nanometers) may improve execution and/or operating efficiency, integrating on-chip storage at similar process node sizes into MCU 102 may be cost prohibitive for certain applications, such as the above noted industrial and/or vehicle settings.

To avoid integrating excessive on-chip storage (or sufficiently large amounts of such on-chip storage to accommodate storage of data representative of executable code) having similar, if not the same, process node sizes, MCU 102 may interface with external NVM system 104 having larger process node sizes (e.g., larger than 20 nanometers) to retrieve data representative of executable code or access other data required for controlling certain systems and/or performing signal processing. However, such external NVM systems may pose a security concern as the data representative of executable code or data stored to the external NVM systems may be read and/or manipulated, resulting in potential safety concerns (e.g., especially when considering operational control of vehicle systems, such as driver assistance systems, and/or safety systems for controlling motors or other devices, such as industrial robots used in manufacturing).

To overcome this security concern, some external NVM systems may implement complex security protocols (e.g., a checksum) that involve security checks each time the data stored to the external NVM system is read and/or written. While promoting security, the extensive security protocols implemented by such external NVM systems may inject significant delay in accessing data stored to the external NVM systems. The delay may result in poor user experiences, while the processing necessary to support these extensive security protocols may consume significant resources (e.g., in terms of processor cycles, memory space, memory bandwidth, and the accompanying power).

In accordance with various aspects of the techniques described in this disclosure, external NVM system 104 (which is external to MCU 102) may securely store data in a manner that prevents tampering or other manipulation of the data stored to NVM 124 while also promoting near real-time access of the data stored to NVM 124. Memory controller 122 may determine a current cryptographic signature 133 for data 145 (which may be representative of executable code and therefore may be referred to as code 145) stored to NVM 124 and only allows replacement of current cryptographic signature 133 ("current signature 133") whenever the NVM 124 is written to and does not otherwise permit writing current cryptographic signature 133.

Replacement cryptographic signature 135 ("replacement signature 135") for current cryptographic signature 133 may adhere to cryptographic properties in that replacement cryptographic signature 135 always differs from current cryptographic signature 133. In addition, memory controller 122 may not change current signature 133 when NVM 124 is read, always changes current signature 133 when NVM 124 is written (with different data), and is changed with the above noted cryptographic properties.

Memory controller 122 may return replacement signature 135 (which is the new current signature 133) to MCU 102, which may encrypt replacement cryptographic signature 135 and separately store the encrypted replacement cryptographic signature 135 as reference cryptographic signature 153 ("reference signature 153"). Responsive to a read request from MCU 102 to read data 145 stored to NVM 124, memory controller 122 may output, to MCU 102, current signature 133 (which was replacement signature 135) along with data 145. MCU 102 may then compare separately stored reference signature 153 to current signature 133 in order to verify that data 145 is valid and has not been manipulated. MCU 102 may then, after verifying that data 145 is valid and has not been manipulated, process data 145 (e.g., when data 145 represents code, execute code 145).

In some instances, memory controller 122 may only output current signature 133 responsive to a first read request received from MCU 102 after powering on ECU 100A. After this first verification of current signature 133, memory controller 122 may not, responsive to subsequent read requests prior to any subsequent power cycle (meaning at least removing power from ECU 100A), provide current signature 133. By only providing current signature 133 responsive to the first read request after powering on ECU 100A (while also adhering to the strict conditions for reading and writing data to NVM 124 in terms of updating current signature 133), memory controller 122 may ensure security without requiring extensive security protocols that may consume significant computing resources while also resulting in delays that may impact the user experience (or potential operation of the industrial control machines or robots and/or vehicle systems).

In operation, NVM 124 may be adapted to store data 145. Although not shown in the example of FIG. 1A, NVM 124 may also store current signature 133. Memory controller 122 may, when writing data 145 to NVM 124, invoke a cybersecurity (CS) unit 132 to calculate or otherwise obtain current signature 133. CS unit 132 may represent a unit configured to compute current signature 133 through application of a cryptographic algorithm that produces current signature 133 that adheres to the above noted cryptographic properties. CS unit 132 may apply a physical true random number generator to generate current signature 133. As an alternative, CS unit 132 may apply a random number generator with data 145 as the seed (or updates to data 145 as the seed) to generate current signature 133. CS unit 132 may also apply a cryptographic hash function to data 145 (e.g., using old data 145 as the seed and only calculate the hash for the data to be written or added to data 145), the result of which may produce current signature 133.

In any event, CS unit 132 may store current signature 133 for data 145 (possibly to NVM 124—such as in a separate partition, e.g., partition 126N for reasons discussed in more detail below of NVM 124—or possibly in fixed NVM integrated into memory controller 122). CS unit 132 may also return, via a read response by way of memory interface 114, current signature 133 to MCU 102.

Responsive to receiving current signature 133, microprocessor 112 may invoke a CS unit 152. CS unit 152 may represent a unit configured to encrypt current signature 133 to generate encrypted current signature for storage as a reference signature 153. Because MCU 102 does not include an NVM, MCU 102 cannot store current signature 133 locally as a reference signature 153. In order to preserve the security of current signature 133, microcontroller 112 invokes CS unit 152 to encrypt current signature 133 using encryption key 157 ("key 157") to generate an encrypted current signature as reference signature 153. As MCU 102 includes no NVM of the small process node sizes, CS unit 152 may obtain key 157 from fuses or other low cost NVM alternatives included within MCU 102. By encrypting current signature 133, microprocessor 112 can safely (or, in other words, securely) store reference signature 153 at an external NVM, such as NVM 124 of external NVM system 104.

However, storing reference signature 153 at NVM 124 of external NVM system 104 may result in a circular update cycle in which attempting to write reference signature 153 to the same partition of NVM 124 as data 145 (e.g., partition 126A) may result in computing a replacement cryptographic signature 135 ("replacement signature 135") for current signature 133, which would invalidate reference signature 153. To overcome the circular update process in which replacement signatures 135 are continually created, MCU 102 may write reference signature 153 to an unsecure partition of NVM 124 (which is not secured by a cryptographic signature).

In the example of FIG. 1A, memory controller 122 partitions NVM 124 into partitions 126A-126N ("partitions 126"), where each of partitions 126 may represent logically separate NVMs that can be assigned individual security properties. In any event, partition 126N may, in this example, have security properties indicating that no cryptographic signature should be maintained for data stored to partition 126N. As such, microprocessor 112 may store reference signature 153 to partition 126N of NVM 124, which may remain secure and difficult to manipulate as a result of CS unit 152 encrypting current signature 133 to produce reference signature 153.

Although shown as only computing and storing a current signature 133 for a single one of partitions 126A that stores data 145, NVM 124 may store data similar to data 145 to multiple different partitions 126, where memory controller 122 may maintain a current signature similar to current signature 133 for each of the multiple different partitions 126. Memory controller 122 may store all of current signatures 133 for multiple partitions 126 to partition 126N in this example. Memory controller 122 and microprocessor 112 may operate in a similar if not the same manner to that described herein when accessing data stored to multiple different partitions 126.

As noted above, memory controller 122 may be configured, responsive to any write request, including a first write request, to write updated data to at least a portion of NVM 124 (such as partition 126A), to perform the following operations that adhere to the above noted cryptographic properties for producing replacement signature 135. First, memory controller 122 may store the updated data received via the first write request (or any other write request) in partition 126A along with at least a portion of data 145 (in the event some of the update data overwrites some portion of data 145) to create updated data 145.

Memory controller 122 may next invoke CS unit 132 to generate, based on updated data 145, replacement signature 135 that always differs from current signature 133. CS unit 132 may store replacement signature 135 as current signature 133. Memory controller 122 may output, responsive to the first write request to store the updated data, current signature 133 to be used by microprocessor 112 as a reference signature. Microcontroller 112 may, as described above, invoke CS unit 152 to encrypt current signature 133 using key 157 (after obtaining key 157 from dedicated hardware storage logic, such as the above noted fuses) to generate encrypted current signature 133 to act as reference signature 153.

Microprocessor 112 may then store reference signature 153 to partition 126N of NVM 124. That is, microprocessor 112 may generate a write request that includes encrypted reference signature 153, where the write request specifies that encrypted reference signature 153 is to be stored to partition 126N of NVM 124. Microprocessor 112 may output the write request to memory controller 122, which may process the write request to store reference signature 153 to partition 126N of NVM 124.

Microprocessor 112 may then, at some later point after ECU 100A has been power cycled, attempt to read updated code 145 in order to execute code 145 and perform some operation (such as control any of the vehicle or industrial systems discussed in more detail above). Microprocessor 112 may transmit a read request for at least a portion of updated code 145 via memory interface 114 (which may also handle transmission of the above noted write requests) to memory controller 122. Responsive to receiving the read request, memory controller 122 may retrieve at least the portion of updated data 145 from partition 126A of NVM 124 along with current signature 133 (possibly from partition 126N of NVM 124), outputting the portion of updated data 145 along with current signature 133 via memory interface 114 as a read response to microprocessor 112.

Responsive to receiving the read response, microprocessor 112 may interface with memory controller 122 via memory interface 114 to issue a read request for reference signature 153 stored to partition 126N of NVM 124. Memory controller 122, responsive to this read request for reference signature 153, may access partition 126N of NVM 124 to obtain reference signature 153, outputting a read response via memory interface 114 to microprocessor 112 that includes reference signature 153. Microcontroller 112 may then, responsive to the read response, invoke CS unit 152 to decrypt reference signature 153 using key 157 to obtain decrypted reference signature 153 to which microcontroller 112 may compare current signature 133 provided along with at least the portion of updated code 145 via the previous read response. In some instances, CS unit 152 may encrypt current signature 133 rather than decrypt reference signature 153, making the comparison between encrypted current signature 133 and encrypted reference signature 153.

When decrypted reference signature 153 differs from current signature 133, microprocessor 112 may determine that at least the portion of updated code 145 is invalid and refrain from executing at least the portion of updated code 145. When decrypted reference signature 153 matches current signature 133, microprocessor may determine that at least the portion of updated code 145 is valid and execute at least the portion of updated code 145 (or in other ways process at least the portion of updated data 145 when updated data 145 is not representative of updated code).

In this way, various aspects of the techniques may enable processors having small process node sizes (e.g., less than 20 nanometers), such as MCU 102, to securely interface with external NVM systems having larger process node sizes (e.g., greater than 20 nanometers), such as external NVM system 104. As the MCU 102 may have small process nodes sizes, MCU 102 may be faster (e.g., due to the smaller process nodes sizes, which may result in less distance within the node itself as well as between nodes) while also being more efficient to operate (e.g., in terms of power consumption). Further, because larger process node sizes may be used for external NVM system 104, external NVM system 104 may be less expensive while still enabling secure storage of data that reduces, if not eliminates, security risks as a result of the cryptographic protections. In this respect, various aspects of the techniques may improve operation of computing devices, such as ECU 100A, themselves.

In the example of FIG. 1B, ECU 100B may be substantially similar to ECU 100A except that ECU 100B includes an additional external NVM system 164. External NVM system 164 may, although not shown in the detail, be similar to, or the same as, external NVM system 104 except that external NVM system 164 is not secured via the signatures, such as current signature 133. Rather, external NVM system 164 may be used to store reference signature 153, which are encrypted in the same manner described above to prevent unauthorized access to reference signature 153.

Figure 2:
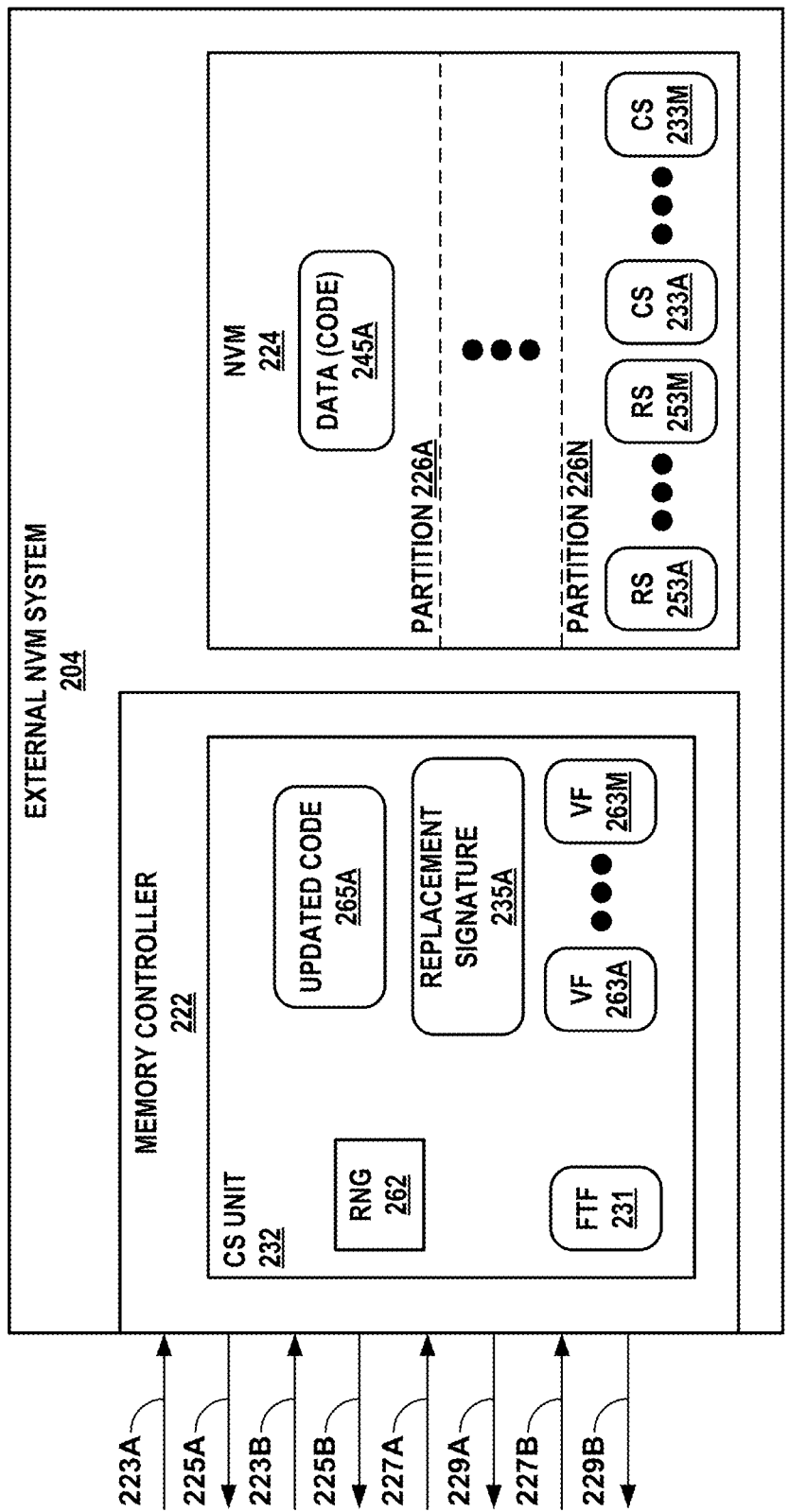
FIG. 2 is a block diagram illustrating an example of external NVM system of FIG. 1A in more detail.

FIG. 2 is a block diagram illustrating an example of external NVM system of FIG. 1A in more detail. External NVM system 204 shown in the example of FIG. 2 may represent one example of external NVM system 104 shown in the example of FIG. 1A. Similar to external NVM system 104, external NVM system 204 may include a memory controller 222 and an NVM 224. Memory controller 222 may represent an example of memory controller 122, while NVM 224 may represent an example of NVM 124.

Initially, external NVM system 204 may be powered off, where external NVM system 204 may maintain data 245A (such as code, and as above, may be referred to as code 245A or executable code 245A) while not receiving power or otherwise deactivated. Upon powering on external NVM system 204, external NVM system 204 may initialize memory controller 222, which may result in memory controller 222 presenting an interface by which an MCU, such as MCU 102 shown in the example of FIG. 1A, may interact with memory controller 222 to access NVM 224.

Memory controller 222 may present the interface as a double data rate (DDR) interface by which to receive read requests and write requests (as well as other I/O operations as described above). Memory controller 222 may, for example, receive read request 223A from MCU 102. Read request 223A may conform to the DDR protocol or other memory access protocols. Memory controller 222 may process read request 223A to retrieve data 245A or some portion thereof from NVM 224.

In processing read request 223A, memory controller 232 may invoke CS unit 232 prior to accessing NVM 224. CS unit 232 may represent an example of CS unit 132 shown in the example of FIGS. 1A and 1B. CS unit 232 may maintain a first time flag (FTF) 231, which is reset each time memory controller 222 is initialized to indicate that NVM 224 has not yet been accessed since memory controller 222 was last initialized (or, in other words, has not yet been accessed since memory controller 222 was powered cycled, which is another way of referring to rebooted). CS unit 232 may access FTF 231 to determine whether read request 223A represents a first read request received directly after a reboot of external NVM system 204.

CS unit 232 may, in this instance, determine that read request 223A represents the first read request received directly after the reboot of external NVM system 204 (e.g., by determining that FTF 231 is set to a logical value of one). CS unit 232 may then indicate that memory controller 222 should retrieve both the portion of data 245A (or possible all of data 245A) along with a current cryptographic signature corresponding to partition 226A of NVM 224.

In the example of FIG. 2, NVM 224 includes partitions 226A-226N, with partitions 226A-226M assumed (for purposes of example) to be configured to require cryptographic protection and partition 226N configured to have no cryptographic protection (for reasons discussed in more detail above with respect to the example of FIG. 1A). Partition 226N stores current cryptographic signatures (denoted as "CS") 233A-233M (which may be encrypted) along with reference cryptographic signatures (denoted as "RS") 253A-253M. In the example of FIG. 2, it is assumed that CS 233A corresponds to partition 226A, CS 233B corresponds to partitions 226B, etc. Furthermore, it is assumed that RS 253A is used as a reference signature for CS 233A, RS 253B is used as the reference signature for CS 233B, etc. While these assumptions are made to facilitate explanation of these examples, it should be understood that any one of CS 233A-233M ("CS 233") may correspond to any one of partitions 226A-226M ("partitions 226") while any one of RS 253A-253M ("RS 253") may be used as a reference signature for any one of CS 233.

In any event, CS unit 232 may retrieve, from partition 226A of NVM 224, data 245A or some portion thereof identified by read request 223A along with CS 233A from partition 226N of NVM 224. Memory controller 222 may next generate a read response 225A that includes data 245A (or some portion thereof) and CS 233A, transmitting read response 225A to MCU 102 via the interface.

MCU 102 may process read response 225A, parsing data 245A (or a portion thereof) and CS 233A from read response 225A. MCU 102 may, response to parsing CS 233A from read response 225A, determine that one of RS 253 associated with partition 226A corresponds to CS 233A. MCU 102 may, in response to determining that RS 253A (in this example) corresponds to CS 233A, generate a read request 223B that requests RS 253A stored to partition 226N. MCU 102 may transmit read request 223B to memory controller 222, which may process read request 223B by retrieving RS 253A from partition 226N of NVM 224. Memory controller 222 may generate a read response 225B that includes RS 253A, transmitting read response 225B to MCU 102.

MCU 102 may receive read response 225B and process read response 225B to obtain RS 253A. MCU 102 may invoke CS unit 152, passing RS 253A to CS unit 152. CS unit 152 may decrypt RS 253A using key 157 and compare decrypted RS 253A to CS 233A. Responsive to decrypted RS 253A failing to match CS 233A, CS unit 222 may indicate that code 245A is unsafe to execute (given that code 245A may have been changed or otherwise tampered with). Responsive to decrypted RS 253A matching CS 233A, CS unit 222 may indicate that code 245A is safe to execute, whereupon MCU 102 may execute code 245A.

At some later point, MCU 102 may update code 245A due to firmware, software, or other types of updates that may improve security, promote more efficient execution, add additional features, etc. MCU 102 may receive updated code (e.g., via an over-the-air-update, wireless network, universal system bus connection, etc.), and generate a write request 227A that requests that updated code 265A be written to partition 226A (potentially replacing a portion of code 245A, removing a portion of code 245A, and/or adding to code 245A). MCU 102 may transmit write request 227A to memory controller 222.

Responsive to receiving write request 227A, memory controller 222 may process write request 227A to write updated code 265A to partition 226A of NVM 224, which may replace a portion of code 245A, remove a portion of code 245A, and/or add to code 245A. Prior to writing the updated code to partition 226A, memory controller 222 may invoke CS unit 232 to security enable writing of updated code 265A to partition 226A.

That is, CS unit 232 may set a valid flag (VF) of VFs 263A-263M ("VFs 263") associated with partition 226A. As noted above, it is assumed that VF 263A is associated with partition 226A, but it should be understood that any one of VFs 263 may be associated with partition 226A. In any event, CS unit 232 may set valid flag 263A to indicate that partition 226A is not valid. CS unit 232 may set valid flag 263A in this manner to secure writing of updated code 265A, as external NVM system 204 may be manipulated to write malicious data to partition 226A and then be powered off in which case the old CS 233A (which has not yet been replaced to reflect the manipulation of code 245A stored to partition 226A) may remain valid despite the change to code 245A. CS unit 232 may therefore always check VF 263A prior to reading CS 233A to ensure that CS 233A is valid.

In this instance, CS 232 may set VF 263A to indicate that CS 233A is invalid, whereupon memory controller 222 may write updated code 265A to code 245A. Once updated code 265A has successfully been written to partition 226A, memory controller 222 may invoke CS unit 232 to generate a replacement signature 235A based on updated code 265A (or possible based on the updated version of code 245A) using RNG 262 as a seed. Memory controller 222 may save replacement signature 235A as CS 233A (replacing the old version of CS 233A) and generate a write response 229A that includes replacement signature 235A (which again is the new CS 233A). Memory controller 222 may transmit write response 229A to MCU 102.

MCU 102 may receive write response 229A and parse replacement signature 235A from write response 229A. MCU 102 may invoke CS unit 152, passing replacement signature 235A to CS unit 152, which may encrypt replacement signature 235A using key 157 (thereby obtaining a new RS 253A). MCU 102 may generate a new write request 227B that requests that new RS 253A be written to partition 226N of NVM 224. MCU 102 may transmit write request 227B to external NVM system 204.

Memory controller 222 may receive write request 227B, parsing new RS 253A from write request 227B. Memory controller 222 may store new RS 253A in place of existing RS 253A. Upon successfully storing new RS 253A in place of existing RS 253A, memory controller 222 may interface with CS unit 232 to indicate that the write of updated code 265A to partition 226A is complete, whereupon CS unit 232 may set VF 263A to indicate that CS 233A is once again valid. Memory controller 222 may, responsive to CS unit 232 indicating that CS 233A is once again valid, generate a write response 229B indicating that the write of RS 253A is complete. Memory controller 222 may transmit write response 229B to MCU 102.

MCU 102 may receive write response 229B indicating that the write of RS 253A is complete. MCU 102 may continue to function in this manner, likely issuing subsequent read requests similar to read request 223B to read code 245A for purposes of executing code 245A.

In some instances, after writing code 245A, memory controller 222 may invoke CS unit 232 to set FTF 231 to indicate that this is a first time that code 245A has been read since code 245A was updated. In these instances, which are similar to a power cycle, memory controller 222 may send CS 233A so that MCU 102 can validate code 245A (and ensure no malicious data was written during the update process of code 245A). In other instances, due to the process described above involving VF 263A that secures the write, memory controller 222 may process the subsequent read requests without requiring validation via CS 233A and RS 253A. In either event, memory controller 222 may continue to interact in this manner with MCU 102 responsive to read requests and write requests to potentially provide secure storage architectures for computing devices, such as ECU 100A/100B.

Figure 3:
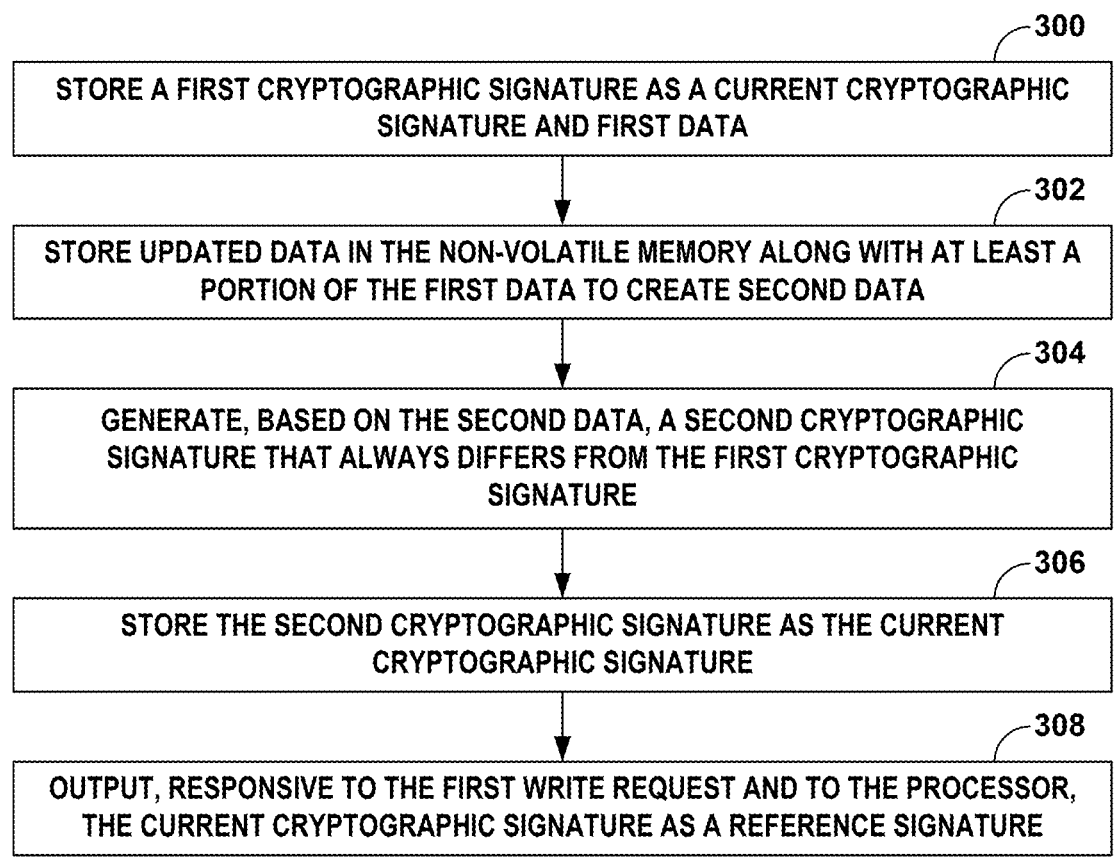
FIG. 3 is a flow diagram illustrating example operation of external NVM system of FIG. 1A in perform various aspects of the secure external storage techniques described in this disclosure.

FIG. 3 is a flow diagram illustrating example operation of external NVM system of FIG. 1A in perform various aspects of the secure external storage techniques described in this disclosure. NVM 124 may be adapted to store data 145. Although not shown in the example of FIG. 1A, NVM 124 may also store current signature 133. Memory controller 122 may, when writing data 145 to NVM 124, invoke a cybersecurity (CS) unit 132 to calculate or otherwise obtain current signature 133. CS unit 132 may represent a unit configured to compute current signature 133 through application of a cryptographic algorithm that produces current signature 133 that adheres to the above noted cryptographic properties. CS unit 132 may apply a physical true random number generator to generate current signature 133. CS unit 132 may also apply a cryptographic hash function to data 145 (e.g., using old data 145 as the seed and only calculate the hash for the data to be written or added to data 145), the result of which may produce current signature 133.

In any event, CS unit 132 may store current signature 133 for data 145 (possibly to NVM 124—such as in a separate partition, e.g., partition 126N for reasons discussed in more detail above—or possibly in fixed NVM integrated into memory controller 122) as well as data 145 (300). CS unit 132 may also return, via a read response by way of memory interface 114, current signature 133 to MCU 102.

Responsive to receiving current signature 133, microprocessor 112 may invoke a CS unit 152. CS unit 152 may represent a unit configured to encrypt current signature 133 to generate encrypted current signature for storage as a reference signature 153. Microprocessor 112 can safely (or, in other words, securely) store reference signature 153 at an external NVM, such as NVM 124 of external NVM system 104.

As noted above, memory controller 122 may be configured, responsive to any write request, including a first write request, to write updated data to at least a portion of NVM 124 (such as partition 126A), to perform the following operations that adhere to the above noted cryptographic properties for producing replacement signature 135. First, memory controller 122 may store the updated data received via the first write request (or any other write request) in partition 126A along with at least a portion of data 145 (in the event some of the update data overwrites some portion of data 145) to create updated data 145 (302).

Memory controller 122 may next invoke CS unit 132 to generate, based on updated data 145, replacement signature 135 that always differs from current signature 133 (304). CS unit 132 may store replacement signature 135 as current signature 133 (306). Memory controller 122 may output, responsive to the first write request to store the updated data, current signature 133 to be used by microprocessor 112 as a reference signature (308). Microprocessor 112 may, as described above, invoke CS unit 152 to encrypt current signature 133 using key 157 (after obtaining key 157 from dedicated hardware storage logic, such as the above noted fuses) to generate encrypted current signature 133 to act as reference signature 153.

Microprocessor 112 may then store reference signature 153 to partition 126N of NVM 124. That is, microprocessor 112 may generate a write request that includes encrypted reference signature 153, where the write request specifies that encrypted reference signature 153 is to be stored to partition 126N of NVM 124. Microprocessor 112 may output the write request to memory controller 122, which may process the write request to store reference signature 153 to partition 126N of NVM 124.

Figure 4:
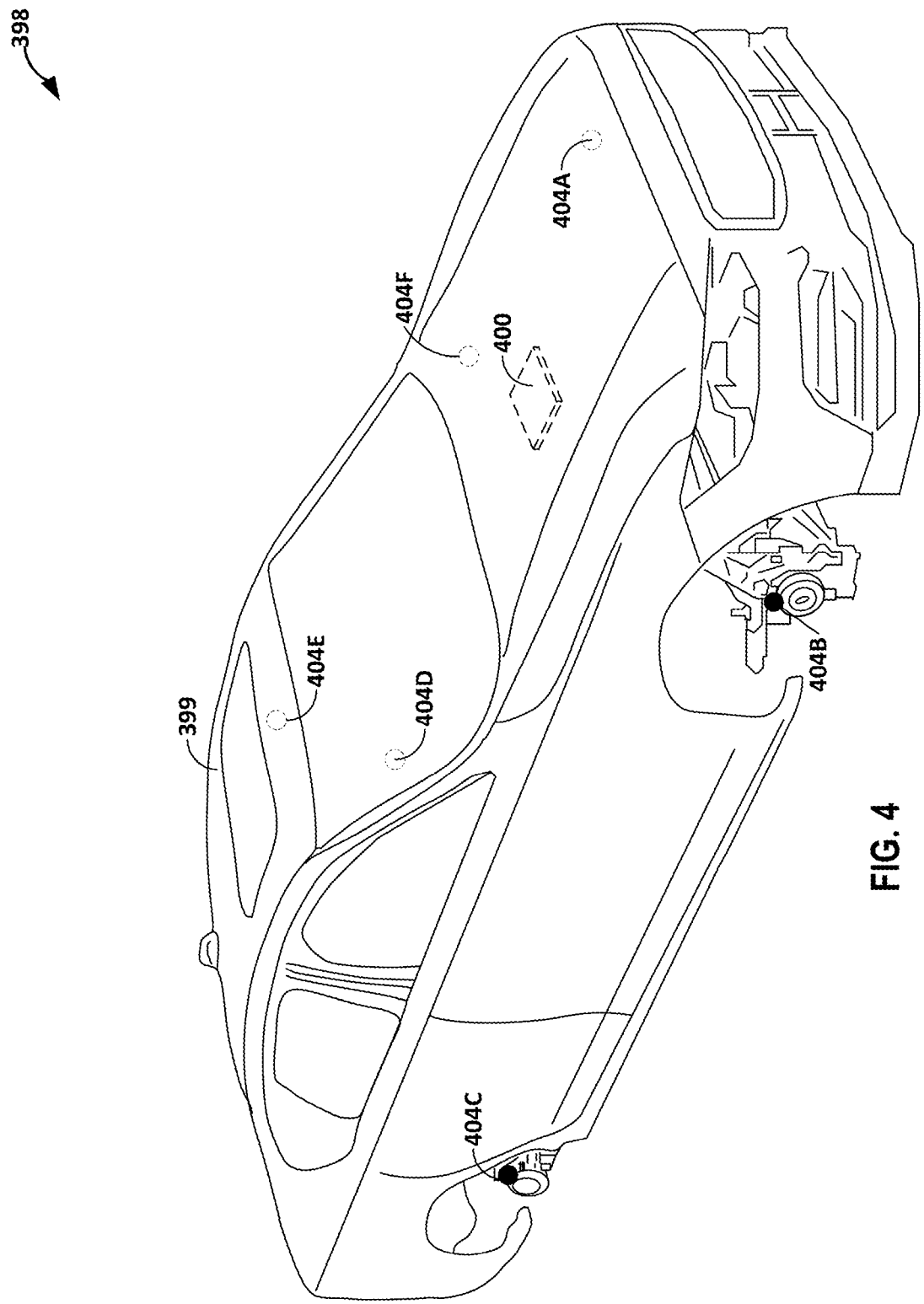
FIG. 4 is a diagram illustrating an example system configured to perform various aspects of the secure external storage techniques described in this disclosure.

FIG. 4 is a diagram illustrating an example system configured to perform various aspects of the secure external storage techniques described in this disclosure. As shown in the example of FIG. 4, system 398 includes a vehicle 399. Although shown as an automobile in the example of FIG. 4, vehicle 399 may represent any type of vehicle, including an automobile, a truck, farm equipment, a motorcycle, a bike (including electronic bikes), a scooter, construction equipment, a semi-truck, an airplane, a helicopter, a military vehicle, or any other type of vehicle capable of implementing various aspects of the secure external storage techniques described in this disclosure.

As further shown in the example of FIG. 4, vehicle 399 includes a computing system 400 (which may represent one example of ECU 100A/100B shown in the examples of FIGS. 1A and 1B) and a plurality of sensors 404A-404F ("sensors 404"). Computing system 400 and some of sensors 404 are shown in the example of FIG. 4 using dashed lines to denote that computing device 400 and sensors 404 may not be visible or are otherwise integrated within vehicle 399.

Computing system 400 may include one or more electronic control unit (ECUs) and a computing device. For example, computing system 400 may include an ECU configured to control the ABS (which may also control TC), an ECU configured to control the Electronic Stability Control (ESC) system, and a main ECU acting as the computing device to direct operation of all of the systems (including those not listed in this example). Generally, an ECU includes a microcontroller, and memory (such as one or more of static random access memory—SRAM, electrically erasable programmable read-only memory—EEPROM, and Flash memory), digital and/or analog inputs, digital and/or analog outputs (such as relay drivers, H bridge drivers, injector drivers, and logic outputs).

In some examples, rather than utilize an ECU as the computing device, computing system 400 may include a relatively more powerful processor (compared to the microcontroller) configured to execute instructions or other forms of software to perform various aspects of the techniques described in this disclosure. The processor may represent one or more of fixed function, programmable, or combinations thereof, such as microprocessors, digital signal processors (DSPs), application specific integrated circuits (ASICs), field programmable gate arrays (FPGAs), discrete logic, software, hardware, firmware or any combinations thereof. When the techniques are implemented partially in software, computing system 400 may store instructions for the software in a suitable, non-transitory computer-readable medium (e.g., external NVM system 204 shown in the example of FIG. 2) and execute the instructions in hardware using one or more processors to perform the techniques of this disclosure. A device including computing system 400 may comprise an integrated circuit, and/or a microprocessor.

For purposes of illustration, computing system 400 is assumed to represent a processor communicatively coupled to one or more ECU responsible for controlling operation of the ABS and the ESC system. The ABS ECU may be communicatively coupled to sensors 404 configured to sense wheel speed at each of the wheels of vehicle 401. Sensors 404A-404D may represent examples of sensors 404 configured to sense wheel speed at the wheels of vehicle 399 (although the wheels are not shown so as to illustrate an approximate location of sensors 404B and 404C), and as such may be referred to as "wheel speed sensors 404."

The ESC ECU may be communicatively coupled to the wheel speed sensors 404, a sensor 404E configured to sense lateral acceleration and/or yaw rate, and/or a sensor 404F configured to sense a steering angle (and as such may be referred to as a "steering angle sensor 404F" or "SAS 404F"). Sensor 404E may include one or more of an accelerometer and a gyroscopic device (or, in other words, gyroscope) and as such may be referred to as "accelerometer/gyroscope sensor 404E" or "A/E sensor 404E." SAS 404F may include an analog sensor that senses a voltage that varies between 0 and 5 volts (V) as the steering wheel is turned. Alternatively, SAS 404F may represent a digital SAS that includes a light emitting diode that emits light upon a wheel that acts as a shutter, where an optic sensor measures the interruption of light and converts those interruptions into a representation of the steering angle.

The processor may be communicatively coupled to the ABS ECU and the ESC ECU to obtain various sensor signals provided by sensors 404 to the ABS ECU and the ESC ECU. Although described as being separate ECUs, a single ECU may control both the ABS and ESC. For example, the processor may interface with the ABS ECU and the ESC ECU to obtain sensor signals representative of the wheel speed provided by wheel speed sensor 404, sensor signals representative of the lateral speed and/or yaw rate provided by A/G sensor 404D, sensor signals representative of the steering angle provided by SAS 404F, and any other type of sensor signal representative of one or more states of vehicle 399 (such as sensor signals representative of relative of one or more of wheel speed, pitch, lateral speed, roll, longitudinal acceleration, longitudinal speed, engine speed, engine torque, etc.).

While described above with respect to a particular ECU for ABS and/or ESC, any type of ECU may implement the above noted aspects of the secure external NVM storage techniques to facilitate better processing performance while potentially reducing costs associated with smaller node memory. For examples, ECUs used to control heating, venting, and air conditioning (HVAC), seat positioning, internal and/or external lighting, seat heating, steering wheel heating, engine control, and the like may implement various aspects of the secure external NVM storage techniques.

In this respect, the foregoing aspects of the techniques may enable the following examples.

Example 1. A non-volatile memory system external to a processor, the non-volatile memory system comprising: a non-volatile memory adapted to store a first cryptographic signature as a current cryptographic signature and first data; and a memory controller configured, responsive to any write request, including a first write request to write updated data to at least a portion of the non-volatile memory, to: store the updated data in the non-volatile memory along with at least a portion of the first data to create second data; generate, a second cryptographic signature that always differs from the first cryptographic signature; store the second cryptographic signature as the current cryptographic signature; and output, responsive to the first write request and to the processor, the current cryptographic signature as a reference signature, wherein the memory controller always replaces the current cryptographic signature, with cryptographic properties, whenever the non-volatile memory is written to and does not otherwise permit writing the current cryptographic signature.

Example 2. The non-volatile memory system of example 1, wherein the non-volatile memory is further adapted to provide a plurality of partitions in which a first partition of the plurality of partitions stores the first data, and wherein the current cryptographic signature includes a first current cryptographic signature that applies only for the first data written to the first partition.

Example 3. The non-volatile memory system of example 2, wherein the plurality of partitions includes a second partition that stores third data and a second current cryptographic signature, and wherein the second current cryptographic signature applies only for the third data written to the second partition.

Example 4. The non-volatile memory system of any combination of examples 1-3, wherein the memory controller is further configured to: specify, prior to storing the updated data in the non-volatile memory, an indication that the current cryptographic signature is invalid; and remove, after successfully storing the updated data in the non-volatile memory, the indication that the current cryptographic signature is invalid.

Example 5. The non-volatile memory system of any combination of examples 1-4, wherein the memory controller is further configured to: receive, from the processor, a first read request to read at least a first portion of the second data from the non-volatile memory; access, responsive to the first read request, the non-volatile memory to retrieve at least the first portion of the second data and the current cryptographic signature; and output, to the processor, at least the first portion of the second data and the current cryptographic signature.

Example 6. The non-volatile memory system of example 5, wherein the processor is configured to: compare, responsive to receiving at least the first portion of the second data and the current cryptographic signature, the current cryptographic signature to the reference cryptographic signature; and process, based on the comparison of the current cryptographic signature to the reference cryptographic signature, at least the first portion of the second data.

Example 7. The non-volatile memory system of any combination of examples 1-6,
wherein the first read request is a first read request received directly after a reboot of the non-volatile memory system, and wherein the memory controller is further configured to: access, responsive to any subsequent read request to read at least a second portion of the second data occurring after the first read request and prior to successive reboot of the non-volatile memory system, the non-volatile memory to retrieve at least the second portion of the second data; and output, to the processor, at least the second portion of the second data without the current cryptographic signature.

Example 8. The non-volatile memory system of any combination of examples 1-7, wherein the processor is configured to encrypt, based on a key, the current cryptographic signature.

Example 9. The non-volatile memory system of example 8, wherein the processor includes on-device hardware logic to securely store the key.

Example 10. The non-volatile memory system of any combination of examples 1-9,
wherein the non-volatile memory is fabricated using a 20 nanometer or larger process, and wherein the processor is fabricated using a 20 nanometer or smaller process.

Example 11. The non-volatile memory system of any combination of examples 1-10, wherein the first data stored to the first partition includes program code to be executed by a processor.

Example 12. The non-volatile memory system of example 10, wherein the processor comprises a microcontroller.

Example 13. A method comprising: storing, by a non-volatile memory system external to a processor, a first cryptographic signature as a current cryptographic signature and first data; responsive to any write request, including a first write request, to write updated data to at least a portion of the non-volatile memory: storing, by a memory controller, the updated data in the non-volatile memory along with at least a portion of the first data to create second data; generating, based on the second data, and by the memory controller, a second cryptographic signature that always differs from the first cryptographic signature; storing, by the memory controller, the second cryptographic signature as the current cryptographic signature; and outputting, responsive to the first write request, to the processor, and by the memory controller, the current cryptographic signature as a reference signature, wherein the memory controller always replaces the current cryptographic signature, with cryptographic properties, whenever the non-volatile memory is written to and does not otherwise permit writing the current cryptographic signature.

Example 14. The method of example 13, providing, by the non-volatile memory, a plurality of partitions in which a first partition of the plurality of partitions stores the first data, and wherein the current cryptographic signature includes a first current cryptographic signature that applies only for the first data written to the first partition.

Example 15. The method of example 14, wherein the plurality of partitions includes a second partition that stores third data and a second current cryptographic signature, and wherein the second current cryptographic signature applies only for the third data written to the second partition.

Example 16. The method of any combination of examples 13-15, further comprising: specifying, prior to storing the updated data in the non-volatile memory, an indication that the current cryptographic signature is invalid; and removing, after successfully storing the updated data in the non-volatile memory, the indication that the current cryptographic signature is invalid.

Example 17. The method of any combination of examples 13-16, further comprising: receiving, from the processor, a first read request to read at least a first portion of the second data from the non-volatile memory; accessing, responsive to the first read request, the non-volatile memory to retrieve at least the first portion of the second data and the current cryptographic signature; and outputting, to the processor, at least the first portion of the second data and the current cryptographic signature.

Example 18. The method of example 17, further comprising: comparing, responsive to receiving at least the first portion of the second data and the current cryptographic signature, the current cryptographic signature to the reference cryptographic signature; and processing, based on the comparison of the current cryptographic signature to the reference cryptographic signature, at least the first portion of the second data.

Example 19. The method of any combination of examples 13-17, wherein the first read request is a first read request received directly after a reboot of the non-volatile memory system, and wherein the method further comprises: accessing, responsive to any subsequent read request to read at least a second portion of the second data occurring after the first read request and prior to successive reboot of the non-volatile memory system, the non-volatile memory to retrieve at least the second portion of the second data; and outputting, to the processor, at least the second portion of the second data without the current cryptographic signature.

Example 20. A system comprising: a processor; and a non-volatile memory system external to the processor, the non-volatile memory system comprising: a non-volatile memory adapted to store a first cryptographic signature as a current cryptographic signature and first data; and a memory controller configured, responsive to any write request, including a first write request, to write updated data to at least a portion of the non-volatile memory, to: store the updated data in the non-volatile memory along with at least a portion of the first data to create second data; generate, based on the second data, a second cryptographic signature that always differs from the first cryptographic signature; store the second cryptographic signature as the current cryptographic signature; and output, responsive to the first write request and to the processor, the current cryptographic signature as a reference signature, wherein the memory controller always replaces the current cryptographic signature, with cryptographic properties, whenever the non-volatile memory is written to and does not otherwise permit writing the current cryptographic signature.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fibre optic cable, twisted pair, digital subscriber line (DSL), or wireless technologies such as infrared, radio, and microwave, then the coaxial cable, fibre optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A non-volatile memory system external to a processor, the non-volatile memory system comprising:
an external non-volatile memory adapted to store a first cryptographic signature as a current cryptographic signature and provide a plurality of partitions in which a first partition of the plurality of partitions stores first data, wherein each of the plurality of partitions represent a logically separate non-volatile memory having different security properties, and wherein an unsecure partition of the plurality of partitions different from the first partition has a first security property of the different security properties indicating that no cryptographic signature is to be maintained for data stored to the unsecure partition; and
a memory controller configured, responsive to any write request, including a first write request to write updated data to at least a portion of the non-volatile memory, to:
store the updated data in the external non-volatile memory along with at least a portion of the first data to create second data;
generate, based on the second data that includes the updated data and at least the portion of the first data, a second cryptographic signature that always differs from the first cryptographic signature;
store, to the unsecure partition, the second cryptographic signature as the current cryptographic signature for the second data; and
output, responsive to the first write request, from the unsecure partition, and to the processor, the current cryptographic signature as a reference signature, wherein the memory controller always replaces the current cryptographic signature in the unsecure partition, with cryptographic properties, whenever the non-volatile memory is written to and does not otherwise permit writing the current cryptographic signature, wherein the external non-volatile memory is fabricated using a process greater than 20 nanometers, and wherein the processor is fabricated using a process less than 20 nanometers.

2. The non-volatile memory system of claim 1,
wherein the current cryptographic signature includes a first current cryptographic signature that applies only for the first data written to the first partition.

3. The non-volatile memory system of claim 2,
wherein the plurality of partitions includes a second partition that stores third data,
wherein the second partition is different than the unsecure partition,
wherein the unsecure partition stores a second current cryptographic signature, and
wherein the second current cryptographic signature applies only for the third data written to the second partition.

4. The non-volatile memory system of claim 1, wherein the memory controller is further configured to:
specify, prior to storing the updated data in the external non-volatile memory, an indication that the current cryptographic signature is invalid; and
remove, after successfully storing the updated data in the external non-volatile memory, the indication that the current cryptographic signature is invalid.

5. The non-volatile memory system of claim 1, wherein the memory controller is further configured to:
receive, from the processor, a first read request to read at least a first portion of the second data from the non-volatile memory;
access, responsive to the first read request, the external non-volatile memory to retrieve at least the first portion of the second data and the current cryptographic signature; and
output, to the processor, at least the first portion of the second data and the current cryptographic signature.

6. The non-volatile memory system of claim 5, wherein the processor is configured to:
compare, responsive to receiving at least the first portion of the second data and the current cryptographic signature, the current cryptographic signature to the reference signature; and
process, based on the comparison of the current cryptographic signature to the reference signature, at least the first portion of the second data.

7. The non-volatile memory system of claim 5,
wherein the first read request is a first read request received directly after a reboot of the non-volatile memory system, and
wherein the memory controller is further configured to:
access, responsive to any subsequent read request to read at least a second portion of the second data occurring after the first read request and prior to successive reboot of the external non-volatile memory system, the external non-volatile memory to retrieve at least the second portion of the second data; and
output, to the processor, at least the second portion of the second data without the current cryptographic signature.

8. The non-volatile memory system of claim 1, wherein the processor is configured to encrypt, based on a key, the current cryptographic signature.

9. The non-volatile memory system of claim 8, wherein the processor includes on-device hardware logic to securely store the key.

10. The non-volatile memory system of claim 1, wherein the first data stored to a first partition includes program code to be executed by a processor.

11. The non-volatile memory system of claim 1, wherein the processor comprises a microcontroller.

12. A method comprising:
storing, by an external non-volatile memory external to a processor, a first cryptographic signature as a current cryptographic signature and provide a plurality of partitions in which a first partition of the plurality of partitions stores first data, wherein each of the plurality of partitions represent a logically separate non-volatile memory having different security properties, and wherein an unsecure partition of the plurality of partitions different from the first partition has a first security property of the different security properties indicating that no cryptographic signature is to be maintained for data stored to the unsecure partition;
responsive to any write request, including a first write request, to write updated data to at least a portion of the external non-volatile memory:
storing, by a memory controller, the updated data in the external non-volatile memory along with at least a portion of the first data to create second data;
generating, based on the second data that includes the updated data and at least the portion of the first data, and by the memory controller, a second cryptographic signature that always differs from the first cryptographic signature;
storing, by the memory controller, and to the unsecure partition, the second cryptographic signature as the current cryptographic signature; and
outputting, responsive to the first write request, from the unsecure partition, to the processor, and by the memory controller, the current cryptographic signature as a reference signature,
wherein the memory controller always replaces the current cryptographic signature, with cryptographic properties, whenever the external non-volatile memory is written to and does not otherwise permit writing the current cryptographic signature,
wherein the external non-volatile memory is fabricated using a process greater than 20 nanometers, and
wherein the processor is fabricated using a process less than 20 nanometers.

13. The method of claim 12,
wherein the current cryptographic signature includes a first current cryptographic signature that applies only for the first data written to the first partition.

14. The method of claim 13,
wherein the plurality of partitions includes a second partition that stores third data,
wherein the second partition is different than the unsecure partition,
wherein the unsecure partition stores a second current cryptographic signature, and
wherein the second current cryptographic signature applies only for the third data written to the second partition.

15. The method of claim 12, further comprising:
specifying, prior to storing the updated data in the external non-volatile memory, an indication that the current cryptographic signature is invalid; and
removing, after successfully storing the updated data in the external non-volatile memory, the indication that the current cryptographic signature is invalid.

16. The method of claim 12, further comprising:
receiving, from the processor, a first read request to read at least a first portion of the second data from the external non-volatile memory;
accessing, responsive to the first read request, the external non-volatile memory to retrieve at least the first portion of the second data and the current cryptographic signature; and
outputting, to the processor, at least the first portion of the second data and the current cryptographic signature.

17. The method of claim 16, further comprising:
comparing, responsive to receiving at least the first portion of the second data and the current cryptographic signature, the current cryptographic signature to the reference signature; and
processing, based on the comparison of the current cryptographic signature to the reference signature, at least the first portion of the second data.

18. The method of claim 16,
wherein the first read request is a first read request received directly after a reboot of the external non-volatile memory, and
wherein the method further comprises:
accessing, responsive to any subsequent read request to read at least a second portion of the second data occurring after the first read request and prior to successive reboot of the external non-volatile memory system, the external non-volatile memory to retrieve at least the second portion of the second data; and
outputting, to the processor, at least the second portion of the second data without the current cryptographic signature.

19. A system comprising:
a processor; and
a non-volatile memory system external to the processor, the non-volatile memory system comprising:
an external non-volatile memory adapted to store a first cryptographic signature as a current cryptographic signature and provide a plurality of partitions in which a first partition of the plurality of partitions stores first data, wherein each of the plurality of partitions represent a logically separate non-volatile memory having different security properties, and wherein an unsecure partition of the plurality of partitions different from the first partition has a first security property of the different security properties indicating that no cryptographic signature is to be maintained for data stored to the unsecure partition; and a memory controller configured, responsive to any write request, including a first write request, to write updated data to at least a portion of the non-volatile memory, to:
store the updated data in the external non-volatile memory along with at least a portion of the first data to create second data;
generate, based on the second data that includes the updated data and at least the portion of the first data, a second cryptographic signature that always differs from the first cryptographic signature;
store, to the unsecure partition, the second cryptographic signature as the current cryptographic signature; and
output, responsive to the first write request, from the unsecure partition, and to the processor, the current cryptographic signature as a reference signature,
wherein the memory controller always replaces the current cryptographic signature, with cryptographic properties, whenever the external non-volatile memory is written to and does not otherwise permit writing the current cryptographic signature,
wherein the external non-volatile memory is fabricated using a process greater than 20 nanometers, and
wherein the processor is fabricated using a process less than 20 nanometers.

* * * * *